United States Patent [19]

Matuda et al.

[11] Patent Number: 4,837,473
[45] Date of Patent: Jun. 6, 1989

[54] COMMUTATOR

[75] Inventors: Shinichi Matuda; Kenji Furuya; Tetsuo Kubo, all of Matsudo, Japan

[73] Assignee: Mabuchi Motor Co., Ltd., Japan

[21] Appl. No.: 148,490

[22] Filed: Jan. 26, 1988

[30] Foreign Application Priority Data

Jan. 28, 1987 [JP] Japan .................................. 62-11179

[51] Int. Cl.⁴ ............................................. H02K 13/06
[52] U.S. Cl. ..................................... 310/237; 310/71; 29/597
[58] Field of Search ................. 310/71, 233, 234, 235, 310/236, 237; 29/597, 863

[56] References Cited

U.S. PATENT DOCUMENTS 4,342,933 8/1982 Gerlach et al. ...................... 310/234
4,521,710 6/1985 Mabuchi .............................. 310/234

Primary Examiner—Patrick R. Salce
Assistant Examiner—Judson H. Jones
Attorney, Agent, or Firm—McGlew & Tuttle

[57] ABSTRACT

A commutator for a miniature motor having a permanent magnet field; comprising a commutator core having a commutator core flat portion, a cylindrical portion provided upright at the center of the flat portion, insert pieces provided in the opposite direction to the cylindrical portion; commutator segments having arc-shaped segment pieces disposed in contact with the outer periphery of the cylindrical portion, and commutator legs disposed along the commutator core flat portion; and a commutator washer engaged with the outer periphery of the arc-shaped segment pieces to fixedly fit the commutator segments to the commutator core; in which winding hooks (in the form of projections or lanced and raised pieces, for example) for hooking rotor windings are provided at predetermined locations of the commutator core flat portions on the sides of the commutator legs disposed in the abovementioned manner.

4 Claims, 5 Drawing Sheets

FIG. 11
(PRIOR ART)
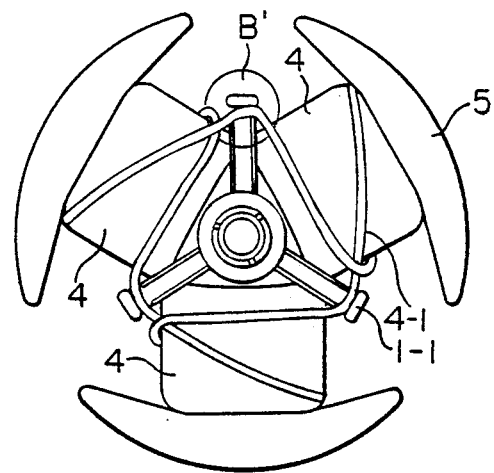
FIG. 12A
(PRIOR ART)
FIG. 12B
(PRIOR ART)
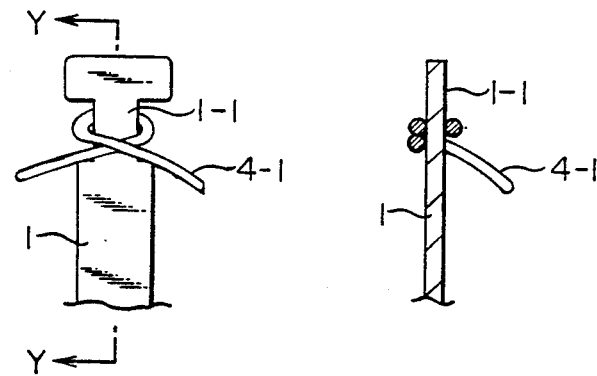

COMMUTATOR

BACKGROUND OF THE INVENTION

This invention relates generally to a commutator, and more particularly to a commutator for a miniature motor having a permanent magnet field; comprising a commutator core having a commutator core flat portion, a cylindrical portion provided upright at the center of the commutator core flat portion, and insert pieces provided in the opposite direction to the cylindrical portion; commutator segments having arc-shaped segment pieces disposed in contact with the outer periphery of the cylindrical portion, and commutator legs disposed along the commutator core flat portion; and a commutator washer engaged with the outer periphery of the arc-shaped segment pieces to fixedly fit the commutator segments to the commutator core; in which projections or lanced and raised pieces are provided at predetermined portions for hooking the ends of the windings of the miniature motor when winding rotor windings.

DESCRIPTION OF THE PRIOR ART

FIG. 9 is a front view of a commutator of a conventional type used in a miniature motor having a permanent magnet field, and FIG. 10 is a partially sectional side elevation of the same. In Figs.9 and 10, symbol A′ refers to a commutator; numeral 1 to a commutator segment; 1—1 to a commutator leg forming a winding wire connecting portion; 1-2 to an arc-shaped segment piece; 2′ to a commutator core; 2-2′ to a cylindrical portion; 2-3′ to an insert piece; and 3 to a commutator washer, respectively.

The commutator A′ comprises the commutator segments 1, the commutator core 2′, and the commutator washer 3. The commutator A′ of FIGS. 9 and 10 has such a construction that the arc-shaped segment pieces 1-2 of the commutator segments 1 are disposed in contact with the outer periphery of the cylindrical portion 2-2′ of the commutator core 2′ and fixedly fitted to the cylindrical portion 2-2′ by passing the commutator segments 1 and the cylindrical portion 2-2′ through a commutator washer 3.

A motor rotor having the commutator A′ is shown in FIG. 11. In FIG. 11, numeral 4 refers to a rotor winding; 4-1 to a lead wire of the rotor winding 4; and 5 to a rotor core, respectively. When a winding is wound on a motor rotor, the rotor winding for one pole is wound on the rotor held in position by a winding chuck (not shown), and then the rotor winding is held at a predetermined location by winding from behind and hooking one end of the winding 4 on the necked portion of the commutator leg 1—1 before the winding for the next pole is wound. The hooked portion of the rotor winding 4 is subsequently fused to the wire connecting portion of the commutator leg 1—1.

With a motor of a thin type where the axial length of the motor is reduced, however, it becomes impossible to hook the lead wire 4-1 of the rotor winding 4 on a predetermined position by means of an automated machine. This is because, with a motor of such a thin type motor in which the wire connecting portion of the commutator leg 1—1 has to be disposed at the farthest possible position toward the paper surface in FIG. 11 since the motor length in the axial direction (in the direction normal to the paper surface in FIG. 11) must be as short as possible, the surface of the rotor winding 4 becomes almost flush with the surface of the commutator leg 1—1 (when measured in the direction normal to the paper surface in FIG. 11), with the result that the rotor winding lead wire 4-1 hooked by an automated machine tends to be easily disengaged from the necked wire connecting portion of the commutator leg 1—1. With a motor of a thin type, it has heretofore been practiced that when the rotor winding 4 for one pole has been wound, the rotor is removed from the winding chuck and one end of the rotor winding 4 is wound by hand on the wire connecting portion of the commutator leg 1—1 (refer to Fig. 12A), and then the winding for the next pole is wound by holding the rotor again on the winding chuck. One end of the wire connecting portion of the rotor winding 4 wound on the commutator leg 1—1 is shown in FIGS. 12A and 12B. FIG. 12 is an enlarged view of the portion B′ of FIG. 11; FIG. 12A being a front view, and FIG. 12B a cross-sectional view taken along line y—y in FIG. 12A.

As described above, the commutator A′ of the conventional type involves inconveniences in mass production, particularly with a motor of a thin type where the rotor has to be removed from the winding chuck to hook by hand one end of the rotor winding on the commutator leg every time the winding for one pole has been wound.

SUMMARY OF THE INVENTION

This invention is intended to overcome the aforementioned problems.

It is a primary object of this invention, therefore, to provide a commutator for a miniature motor having a permanent magnet field; comprising a commutator core having a commutator core flat portion, a cylindrical portion provided upright at the center of the flat portion, insert pieces provided in the opposite direction to the cylindrical portion; commutator segments having arc-shaped segment pieces disposed to contact with the outer periphery of the cylindrical portion, and commutator legs disposed along the commutator core flat portion; and a commutator washer engaged with the outer periphery of the arc-shaped segment pieces to fixedly fit the commutator segments to the commutator core; in which winding hooks for hooking rotor windings are provided at predetermined locations of the commutator core flat portions on the sides of the commutator legs disposed in the abovementioned manner.

It is a secondary object of this invention to provide a commutator in which projections are provided as the winding hooks at predetermined locations of the commutator core flat portion.

It is a further secondary object of this invention to provide a commutator in which tangs struck out from the legs are provided as the winding hooks at predetermined locations of the commutator core flat portion.

These and other objects and advantages of this invention will become apparent from the description which follows, with reference to the following FIGS. 1 through 8.

BRIEF DESCRIPTION OF THE DRAWINGS

FIG. 11 is a diagram showing the commutator of the conventional type fitted to a motor rotor.

FIGS. 12A and 12B are an enlarged front view of the portion B in FIG. 11 and a cross-sectional view taken along line y—y in FIG. 12A.

DETAILED DESCRIPTION OF THE EMBODIMENT

In FIGS. 1 through 12A and 12B, numeral 1 refers to commutator segment; 1—1 to a commutator leg having a winding wire connecting portion; 1-2 to an arc-shaped segment piece; 2 to a commutator core; 2-1 to a projection-shaped winding hook; 2-1' to a tang struck out from the leg; 2—2 to a cylindrical portion; 2-3 to an insert piece; 3 to a commutator washer; 4 to a rotor winding; 4-1 to a rotor winding lead wire; and 5 to a core, respectively.

Figure 1:
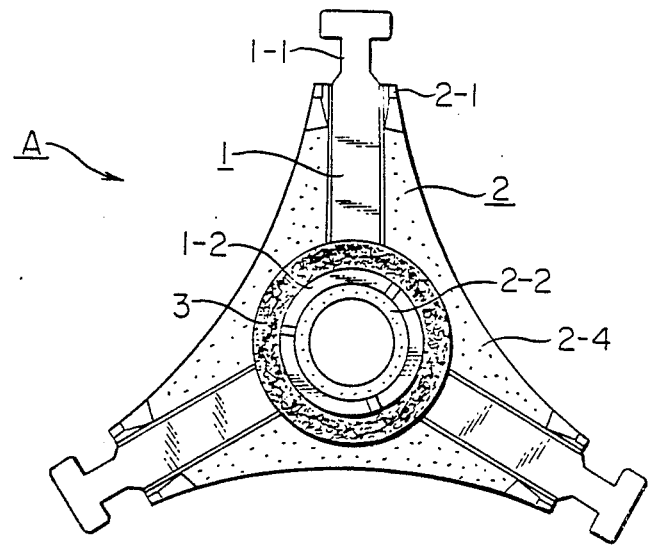
FIG. 1 is a front view showing a first embodiment of the commutator of this invention.
Figure 2:
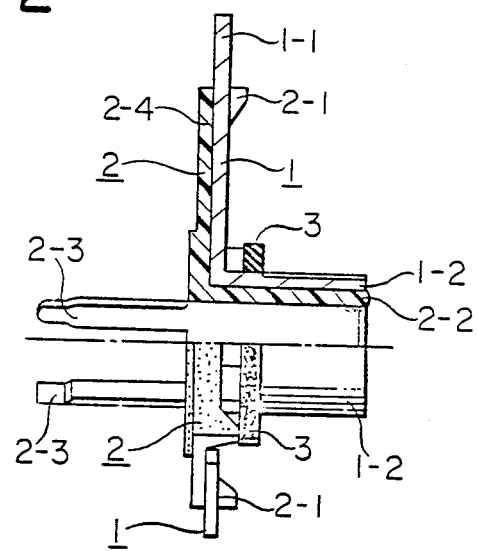
FIG. 2 is a partially sectional side elevation showing the first embodiment of this invention.
Figure 3:
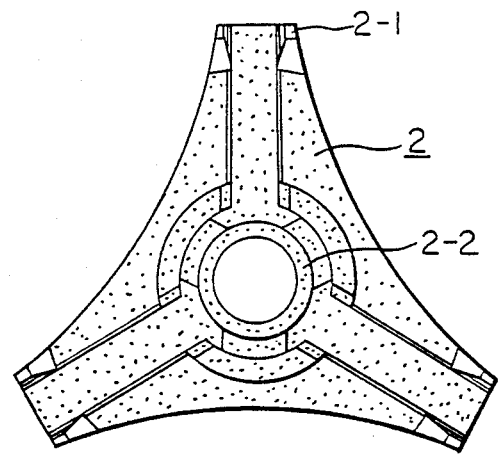
FIG. 3 is a front view showing a commutator core used in this invention.
Figure 9:
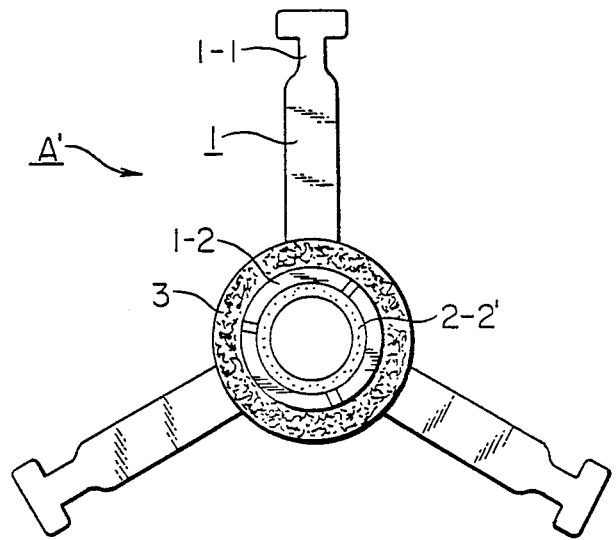
FIG. 9 is a front view showing a commutator of a conventional type.
Figure 10:
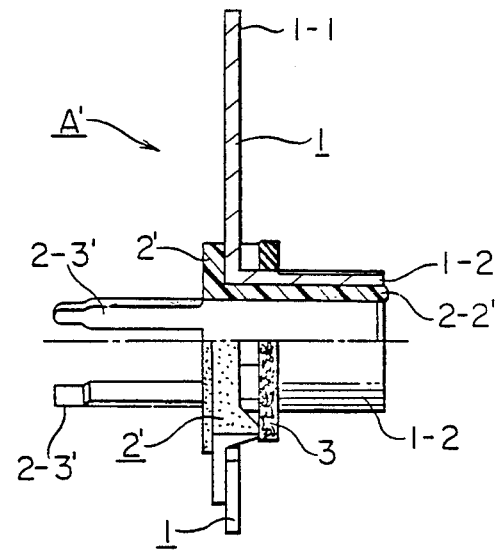
FIG. 10 is a partially sectional side elevation of the commutator of the conventional type.

This invention differs from the prior art shown in FIGS. 9 and 10 in that the projection-shaped winding hook 2-1 is provided only after a commutator core flat portion 2-4 has been formed on the commutator core 2 forming a triangular shape as shown in FIG. 3. The winding hooks 2-1 are provided at predetermined locations (locations suitable for hooking the lead wire of the winding) of the commutator core flat portion 2-4 on both sides of the wire connecting portion of the commutator leg 1-1 of the commutator segment 1 when the commutator segment 1 is joined with the commutator core 2 to assemble the commutator A.

The commutator segment 1 of the same type as used in the prior art is also used in this invention.

Figure 4:
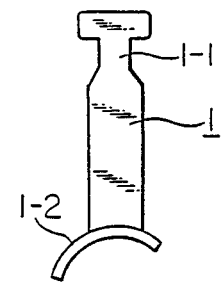
FIG. 4 is a front view showing a commutator segment used in this invention.
Figure 5:
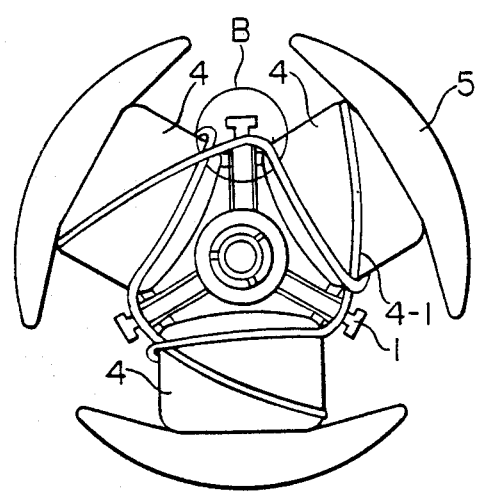
FIG. 5 is a diagram illustrating the first embodiment of the commutator of this invention fitted to a motor rotor.
Figures 6A, 6B:
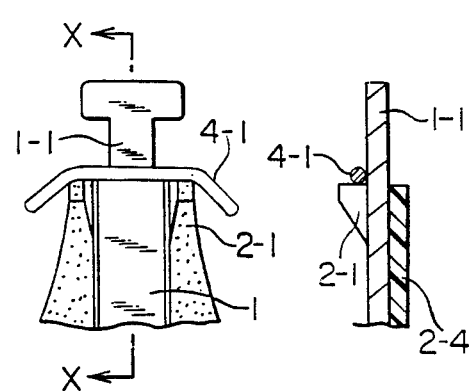
FIGS. 6A and 6B are an enlarged front view showing the portion B in FIG. 5, and a cross-sectional view taken along line X—X in FIG. 6A.

The commutator A is assembled by disposing the commutator segments 1 shown in FIG. 4 on the commutator core 2 shown in FIG. 3 in such a manner that the arc-shaped segment pieces 1-2 of the commutator segments 1 come in contact with the outer periphery of the cylindrical portion 2—2 of the commutator core 2, and fitting the commutator washer 3 to the outer periphery of the arc-shaped segment pieces 1-2.

Since the winding hook 2-1 protrudes above the commutator leg 1—1, the rotor winding lead wire 4-1 can be easily hooked on the protruded winding hook 2-1. Consequently, the hooking operation can be effected by an automated machine without the need for manual labor to remove the rotor from the winding chuck and hook the rotor winding lead wire. As is evident from FIG. 6B, the winding hook 2-1 protrudes above the commutator leg 1—1, so the rotor winding lead wire 4-1 can be positively hooked even with a thin-type motor in which the surface of the rotor winding 4 is almost flush with the surface of the commutator leg 1-1.

Figure 7:
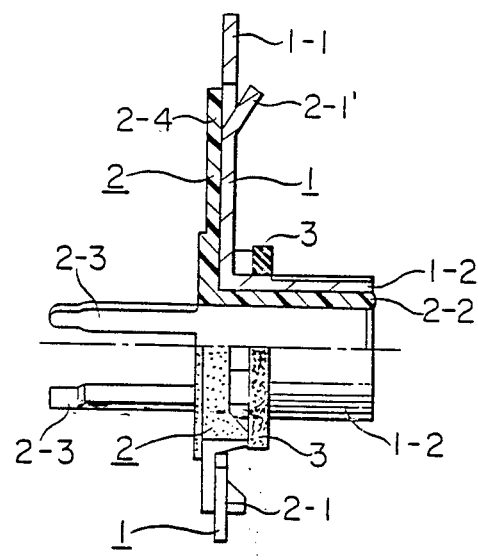
FIG. 7 is a partially sectional side elevation showing a second embodiment of the commutator of this invention.
Figure 8:
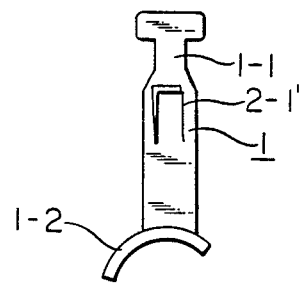
FIG. 8 is a front view of a commutator segment used in the second embodiment of this invention.

In the second embodiment of this invention shown in FIGS. 7 and 8, a tang 2-1' is struck out from the commutator leg 1-1 to provide a radially outwardly facing wire supporting face instead of providing the winding hook 2-1 on the commutator core 2. Consequently, fabrication is made quite4 easy since the tang is easily formed without forming a protruded portion on the commutator core 2.

As described above, this invention, in which a winding hook 2-1 is provided on a commutator core 2 comprising a commutator A, together with commutator segments 1 and a commutator washer 3, makes it possible to easily and positively hook the rotor winding lead wire 4-1 not manually but by means of an automated machine even in a thin-type motor in which the surface of the rotor winding 4 is almost flush with the surface of the commutator leg 1—1.

This invention is also beneficial in terms of volume production since the operation needed for hooking the rotor winding lead wire 4-1 on a projection is so simple that an automated machine can easily perform it, eliminating the need for manual labor to remove the rotor from the winding chuck.

Furthermore, in the prior art having a long commutator leg 1—1, when hooking the rotor winding lead wire in such manner as shown in FIG. 12, a force is exerted in the counterclockwise direction onto the commutator leg 1—1 shown in FIG. 10, producing a backward rotational moment, which tends to raise the tip (on the right side of the figure) of the arc-shaped segment piece 1-2 from the cylindrical surface of the commutator core 2 in FIG. 10.

This invention, on the other hand, can prevent the arc-shaped segment piece 1-2 from raising from the commutator core surface since the force generated by hooking the lead wire is received largely by the winding hook 2-1 of the commutator core 2, even when the commutator leg 1—1 extends up to the winding hook 2-1.

What is claimed is:

1. A commutator comprising an insulating commutator core having a forwardly extending cylindrical portion and insert pieces extending in the opposite direction to said cylindrical portion for attaching the commutator to a rotor; metal commutator segments having arc-shaped segment pieces disposed in contact with the outer periphery of said cylindrical portion and commutator legs extending radially at equally spaced angular positions corresponding to the angular positions between adjacent windings of the rotor, the legs having winding wire connecting portions adjacent radially outer ends thereof; and a commutator washer engaged with the outer periphery of said arc-shaped segment pieces to fixedly fit said commutator segments to said commutator core; characterized in that the commutator core is formed with a flat portion of triangular shape having respective apices spaced radially outwardly of said cylindrical portion at angular positions corresponding to the angular positions of the legs, in the normal direction to the axis of said cylindrical portion so as to lie between respective rotor windings, and along and behind said commutator legs in supporting relation thereto so as to resist axially rearward movement of said commutator legs; and winding hooks for hooking rotor windings and having radially outwardly facing winding supporting surfaces provided at locations of said commutator core flat portions adjacent the sides of said commutator legs.

2. A commutator as claimed in claim 1 wherein the winding hooks comprise projections protruding axially forwardly beyond said commutator legs adjacent sides of said commutator legs.

3. A commutator as claimed in claim 2 wherein the projections are located adjacent both, opposite, sides of respective commutator legs.

4. A commutator comprising an insulating commutator core having a forwardly extending cylindrical portion and insert pieces extending in the opposite direction to said cylindrical portion for attaching the commutator to a rotor; metal commutator segments having arc-shaped segment pieces disposed in contact with the outer periphery of said cylindrical portion and commutator legs extending radially at equally spaced angular positions corresponding to the angular positions between adjacent windings of the rotor, the legs having winding wire connecting portions adjacent the radially outer ends thereof; and a commutator washer engaged with the outer periphery of said arc-shaped segment pieces to fixedly fit said commutator segments to said commutator core; characterized in that the commutator core is formed with a flat portion of triangular shape having rspective apices spaced radially outwardly of said cylindrical portion at angular positions corresponding to the angular positions of the legs, in the normal direction to the axis of said cylindrical portion so as to lie between respective rotor windings and along and behind said commutator legs in supporting relation thereto so as to resist axially rearward movement of said commutator legs; winding wire trapping tangs being struck out from prospective wire connecting portions of said commutator legs to provide radially outwardly facing winding supporting surfaces.

* * * * *